US008081728B2

(12) United States Patent
Wallace et al.

(10) Patent No.: US 8,081,728 B2
(45) Date of Patent: Dec. 20, 2011

(54) METHOD AND APPARATUS FOR CLOCK CORRECTION IN MIMO OFDM

(75) Inventors: Mark S. Wallace, Bedford, MA (US);
Peter Monsen, Wellesley, CA (US);
Irena Medvedev, Somerville, MA (US);
Steven J. Howard, Ashland, MA (US);
Jay Rodney Walton, Carlisle, MA (US)

(73) Assignee: QUALCOMM, Incorporated, San Diego, CA (US)

( * ) Notice: Subject to any disclaimer, the term of this patent is extended or adjusted under 35 U.S.C. 154(b) by 1280 days.

(21) Appl. No.: 11/734,961

(22) Filed: Apr. 13, 2007

(65) Prior Publication Data

US 2008/0089458 A1    Apr. 17, 2008

Related U.S. Application Data

(60) Provisional application No. 60/792,143, filed on Apr. 13, 2006.

(51) Int. Cl.
*H04L 7/00* (2006.01)
*H03D 1/04* (2006.01)

(52) U.S. Cl. ........................................ 375/371; 375/346

(58) Field of Classification Search .................. 375/316,
375/346, 347, 259, 260, 267, 354, 362, 371;
370/203, 206, 208, 464, 480, 491, 498, 500,
370/503, 516
See application file for complete search history.

(56) References Cited

U.S. PATENT DOCUMENTS

| 2002/0065047 A1* | 5/2002 | Moose | 455/63 |
| 2009/0073869 A1* | 3/2009 | Chadha et al. | 370/208 |

FOREIGN PATENT DOCUMENTS

| EP | 1363435 | 11/2003 |
| JP | 2001053712 A | 2/2001 |
| JP | 2002314506 A | 10/2002 |
| JP | 2004104744 A | 4/2004 |
| JP | 2004260423 A | 9/2004 |
| JP | 2004356923 A | 12/2004 |

(Continued)

OTHER PUBLICATIONS

Troya, A. et al.: "Simplified Residual Phase Correction Mechanism for the IEEE 802.11a Standard." Vehicular Technology Conference, 2003. VTC 2003-Fall 2003 IEEE 58th Orlando, FL, USA, Oct. 6-9, 2003, Piscataway, NJ, USA, IEEE, Oct. 6, 2003, pp. 1137-1141, vol. 2, XP010700809, ISBN: 0-7803-7954-3.

(Continued)

*Primary Examiner* — David C. Payne
*Assistant Examiner* — Vineeta Panwalkar
(74) *Attorney, Agent, or Firm* — QUALCOMM Patent Group; Dimitry R. Milikovsky; James H. Yancey, Jr.

(57) ABSTRACT

A method of phase correction at a wireless device includes: estimating a phase slope for an OFDM symbol in a data portion of a packet based on an elapsed time from the start of the packet; measuring a residual phase slope from tracking pilots for the OFDM symbol in the data portion of the packet; and adjusting a phase correction based upon the phase slope and the residual phase slope. Apparatus in a wireless device performs the method and machine-readable media carry instructions for carrying out the method.

19 Claims, 8 Drawing Sheets

FOREIGN PATENT DOCUMENTS

WO    WO2005036846    4/2005

OTHER PUBLICATIONS

Onizawa, T. et al.: "A New Synchronization Scheme for Packet Mode OFDM-SDM Signals in Wireless LAN," Vehicular Technology Conference, 2005. VTC-2005-Fall. 2005 IEEE 62nd, [Online] vol. 2, Sep. 25, 2005, pp. 1021-1025, XP002448089, ISSN: 1090-3038, ISBN: 0-7803-9152-7; Retrieved from the Internet: URL: http://ieeexplore.ieee.org/iel5/10422/33097/01558080.pdf?tp=&arnumber=1558080&isnumber=33097> [retrieved Aug. 28, 2007].

International Search Report, PCT/US2007/066617—International Search Authority—European Patent Office—Sep. 11, 2007.

Written Opinion, PCT/US2007/066617—International Search Authority—European Patent Office—Sep. 11, 2007.

International Preliminary Report on Patentability, PCT/US2007/066617—International Preliminary Examining Authority—European Patent Office—Apr. 25, 2008.

* cited by examiner

METHOD AND APPARATUS FOR CLOCK CORRECTION IN MIMO OFDM

CROSS-REFERENCE

This application claims the benefit of U.S. Provisional Application Ser. No. 60/792,143 entitled "MIMO OFDM Sample Clock Offset Correction," filed on Apr. 13, 2006, the entirety of which is incorporated herein by reference.

FIELD

The present disclosure relates to methods and apparatus for applying phase correction to a receive clock in a communication system. More particularly, the disclosure relates to applying such phase correction in a wireless multiple input/multiple output (MIMO), orthogonal frequency division multiplexed (OFDM) wireless system requiring a highly accurate clock.

BACKGROUND

Wireless communication systems are widely deployed to provide various types of communication; for instance, voice and/or data may be provided via such wireless communication systems. A typical wireless data system, or network, provides multiple users access to one or more shared resources. A system may use a variety of multiple access techniques such as Frequency Division Multiplexing (FDM), Time Division Multiplexing (TDM), Code Division Multiplexing (CDM), and others.

Examples of wireless systems that enable various types of communication include Wireless Local Area Networks (WLANs) such as WLANs that comply with one or more of the IEEE 802.11 standards (e.g., 802.11(a), (b), or (g)). Additionally, IEEE 802.11(e) has been introduced to improve some of the shortcomings of previous 802.11 standards. For example, 802.11(e) may provide Quality of Service (QoS) improvements.

The IEEE 802.11n standard for wireless communications, expected to be finalized in mid-2007, incorporates multiple-input multiple-output (MIMO) multiplexing into the orthogonal frequency-division multiplexing (OFDM) technology adopted by previous versions of the 802.11 standard. MIMO systems have the advantage of considerably enhanced throughput and/or increased reliability compared to non-multiplexed systems.

Rather than sending a single serialized data stream from a single transmitting antenna to a single receiving antenna, a MIMO system divides the data stream into multiple unique streams which are modulated and transmitted in parallel at the same time in the same frequency channel, each stream transmitted by its own spatially separated antenna chain. At the receiving end, one or more MIMO receiver antenna chains receives a linear combination of the multiple transmitted data streams, determined by the multiple paths that can be taken by each separate transmission. The data streams are then separated for processing, as described in more detail below.

In general, a MIMO system employs multiple transmit antennas and multiple receive antennas for data transmission. A MIMO channel formed by the $N_T$ transmit and $N_R$ receive antennas may be decomposed into $N_S$ eigenmodes corresponding to independent virtual channels, where $N_S \leq \min\{N_T, N_R\}$.

In a wireless communication system, data to be transmitted is first modulated onto a radio frequency (RF) carrier signal to generate an RF modulated signal that is more suitable for transmission over a wireless channel. For a MIMO system, up to $N_T$ RF modulated signals may be generated and transmitted simultaneously from the $N_T$ transmit antennas. The transmitted RF modulated signals may reach the $N_R$ receive antennas via a number of propagation paths in the wireless channel. The relationship of the received signals to the transmitted signals may be described as follows:

$$S_R = HS_T + n \qquad \text{Eq. (1)}$$

where $S_R$ is a complex vector of $N_R$ components corresponding to the signals received at each of the $N_R$ receive antennas; $S_T$ is a complex vector of $N_T$ components corresponding to the signals transmitted at each of the $N_T$ transmit antennas; H is a $N_R \times N_T$ matrix whose components represent the complex coefficients that describe the amplitude of the signal from each transmitting antenna received at each receiving antenna; and n is a vector representing the noise received at each receiving antenna.

The characteristics of the propagation paths typically vary over time due to a number of factors such as, for example, fading, multipath, and external interference. Consequently, the transmitted RF modulated signals may experience different channel conditions (e.g., different fading and multipath effects) and may be associated with different complex gains and signal-to-noise ratios (SNRs). In equation (1), these characteristics are encoded in matrix H.

In many wireless communication systems, one or more reference signals, known as pilot tones, are transmitted by the transmitter to assist the receiver in performing a number of functions. The receiver may use the pilot tones for estimating channel response, as well as for other functions including timing and frequency acquisition, data demodulation, and others. In general, one or more pilot tones are transmitted with parameters that are known to the receiver. By comparing the amplitude and phase of the received pilot tone to the known transmission parameters of the pilot tone, the receiving processor can compute channel parameters, allowing it to compensate for noise and errors in the transmitted data stream. Use of pilot tones is discussed further in U.S. Pat. No. 6,928,062, titled "Uplink pilot and signaling transmission in wireless communication systems," the contents of which are incorporated herein by reference.

SUMMARY

Embodiments of aspects of the disclosure include methods and apparatus that improve the signal to noise ration (SNR) in wireless communication systems employing, for example, MIMO and OFDM methods. The inventors have found that improving the phase accuracy of the receive clock in such systems, relative to the transmit clock, helps produce such an improvement. One way to improve the phase accuracy of the receive clock is to first, measure the frequency error in the receive clock relative to a received signal, and remove the measured error from the received signal; and, second, measure and remove a residual phase slope during data-carrying portions of the received signal.

According to aspects of an embodiment, a method of phase correction in a wireless device includes: estimating a phase slope for an OFDM symbol in a data portion of a packet based on an elapsed time from the start of the packet; measuring a residual phase slope from tracking pilots for the OFDM symbol in the data portion of the packet; and adjusting a phase correction based upon the phase slope and the residual phase slope. According to one variation, adjusting comprises adjusting based upon a moving average of the phase slope. In another variation, measuring further comprises: removing an average pilot phase from received pilot symbols; forming conjugates of received pilot symbols; combining the conjugates with the received pilot symbols; weighting the combined conjugates and received pilot symbols; computing angle information; and wherein adjusting further comprises: correcting packets received during a burst including the received pilot symbols using the angle information.

According to aspects of another embodiment, apparatus performs a method of phase correction in a wireless device including: estimating a phase slope for an OFDM symbol in a data portion of a packet based on an elapsed time from the start of the packet; measuring a residual phase slope from tracking pilots for the OFDM symbol in the data portion of the packet; and adjusting a phase correction based upon the phase slope and the residual phase slope. According to one variation, adjusting comprises adjusting based upon a moving average of the phase slope. In another variation, measuring further comprises: removing an average pilot phase from received pilot symbols; forming conjugates of received pilot symbols; combining the conjugates with the received pilot symbols; weighting the combined conjugates and received pilot symbols; computing angle information; and wherein adjusting further comprises: correcting packets received during a burst including the received pilot symbols using the angle information.

According to aspects of yet another embodiment, a machine-readable medium carries instructions for carrying out a method of phase correction in a wireless device including: estimating a phase slope for an OFDM symbol in a data portion of a packet based on an elapsed time from the start of the packet; measuring a residual phase slope from tracking pilots for the OFDM symbol in the data portion of the packet; and adjusting a phase correction based upon the phase slope and the residual phase slope. According to one variation, adjusting comprises adjusting based upon a moving average of the phase slope. In another variation, measuring further comprises: removing an average pilot phase from received pilot symbols; forming conjugates of received pilot symbols; combining the conjugates with the received pilot symbols; weighting the combined conjugates and received pilot symbols; computing angle information; and wherein adjusting further comprises: correcting packets received during a burst including the received pilot symbols using the angle information.

According to aspects of yet a further embodiment, apparatus for performing a method of phase correction in a wireless device includes: means for estimating a phase slope for an OFDM symbol in a data portion of a packet based on an elapsed time from the start of the packet; means for measuring a residual phase slope from tracking pilots for the OFDM symbol in the data portion of the packet; and means for adjusting a phase correction based upon the phase slope and the residual phase slope. According to one variation, the means for adjusting comprises means for adjusting based upon a moving average of the phase slope. In another variation, the means for measuring further comprises: means for removing an average pilot phase from received pilot symbols; means for forming conjugates of received pilot symbols; means for combining the conjugates with the received pilot symbols; means for weighting the combined conjugates and received pilot symbols; computing angle information; and wherein the means for adjusting further comprises: means for correcting packets received during a burst including the received pilot symbols using the angle information.

BRIEF DESCRIPTION OF THE DRAWINGS

In the figures, in which like reference designations indicate like elements.

DETAILED DESCRIPTION

This disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Furthermore, various embodiments are described herein in connection with a subscriber station. Such language should not be considered limiting. A subscriber station can also be called a system, a subscriber unit, mobile station, mobile, remote station, access point, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, a computing device, or any other processing device connected to a wireless modem. Additionally, in accordance with 802.11 terminology, access points, user terminals, etc. are referred to as stations or STAs herein.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, and the like), optical disks (e.g., compact disk (CD), digital versatile disk (DVD) and the like), smart cards, and flash memory devices (e.g., EPROM, card, stick, key drive and the like). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Figure 1:
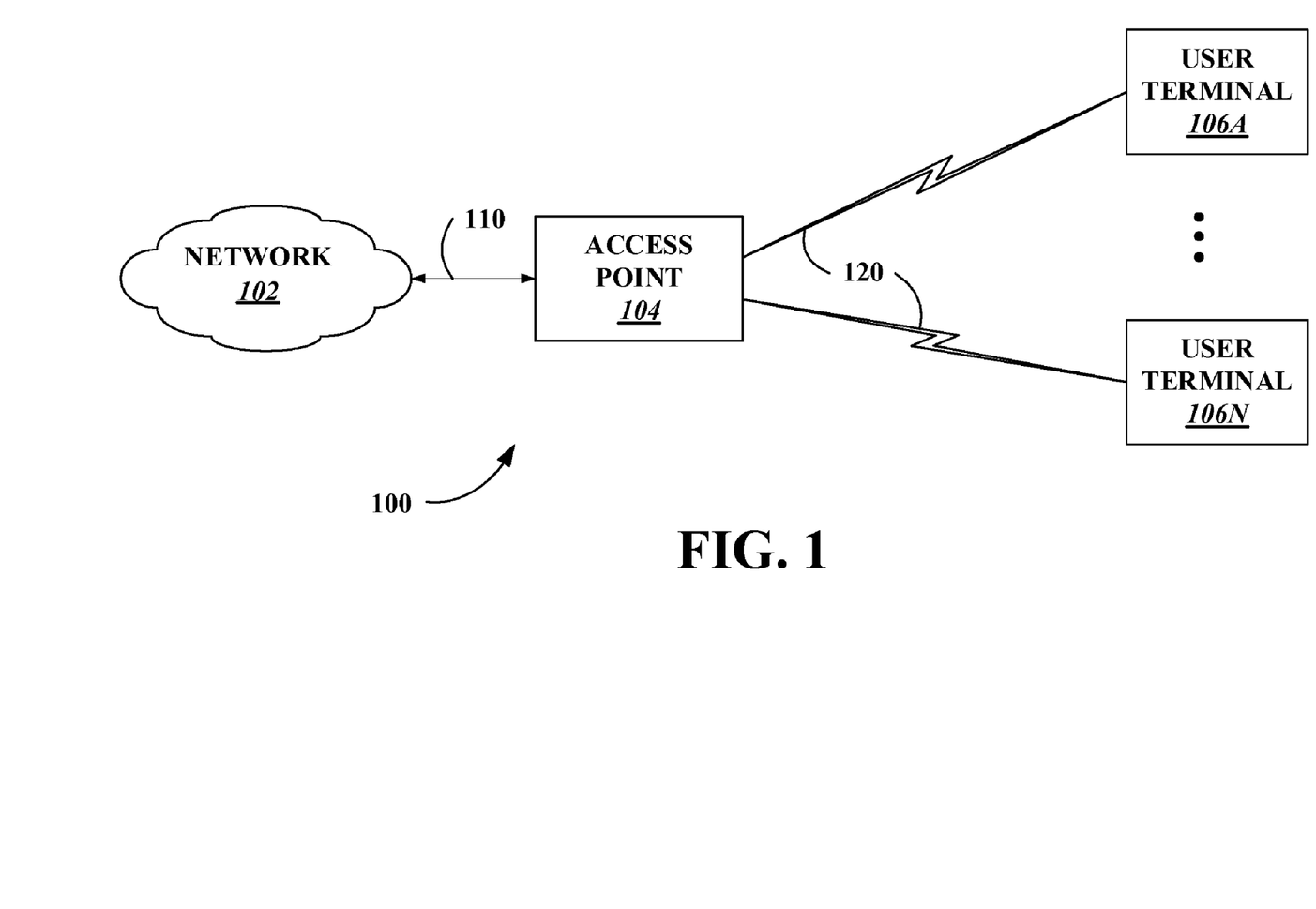
FIG. 1 is an illustration of a wireless communication system in accordance with various aspects set forth herein.

Referring now to FIG. 1, a wireless communication system 100 is illustrated in accordance with various aspects set forth herein. System 100 includes an Access Point (AP) 104 that is communicatively coupled to one or more User Terminals (UTs) $106_1$-$106_N$, where N may be any positive integer. In accordance with 802.11 terminology, AP 104 and UTs $106_1$-$106_N$ are also referred to as stations or STAs herein. AP 104 and UTs $106_1$-$106_N$ communicate via Wireless Local Area Network (WLAN) 120. According to one or more aspects, WLAN 120 is a high speed MIMO OFDM system; however, WLAN 120 may be any wireless LAN. Access point 104 communicates with any number of external devices or processes via network 102. Network 102 may be the Internet, an intranet, or any other wired, wireless, or optical network. Connection 110 carries signals from the network 102 to the access point 104. Devices or processes may be connected to network 102 or as UTs $106_1$-$106_N$ (or via connections therewith) on WLAN 120. Examples of devices that may be connected to either network 102 or WLAN 120 include phones, Personal Digital Assistants (PDAs), computers of various types (laptops, personal computers, workstations, terminals of any type), media devices such as HDTV, DVD player, wireless speakers, cameras, camcorders, webcams, and virtually any other type of data device. Processes may include voice, video, data communications, etc. Various data streams may have varying transmission requirements, which may be accommodated by using varying QoS techniques.

System 100 may be deployed with a centralized AP 104. All UTs $106_1$-$106_N$ may communicate with AP 104 according to an example. Additionally or alternatively, two or more of the UTs $106_1$-$106_N$ may communicate via direct peer-to-peer communication (e.g., employing Direct Link Set-Up (DLS) associated with 802.11(e)). Access may be managed by AP 104 and/or may be ad hoc (e.g., contention based).

The receiver of an MIMO OFDM system uses a sample clock, sometimes referred to herein as a receive clock, to recover symbols from a received stream of message packets. Symbols are discriminated on the basis of very precise differences in phase and/or frequency of OFDM tones. The sample clock at the receiver of an MIMO OFDM system is not locked to the transmitter clock, so the phase and frequency information recovered from the received packet using the sample clock will always include a small, not infinitesimal, error, which may vary over the received packet. One effect of the error between the receiver and transmitter is a phase slope which appears across the OFDM tones. If the phase slope is not properly removed the receiver performance will suffer; this is especially true for long packets and higher order quadrature amplitude modulation (QAM) modulations, i.e., one with many tones closely spaced within the phase frequency constellation, often found in MIMO OFDM based systems. The problem manifests as an inability to distinguish tones that are spatially close within the constellations of allowed tones. The advantage to properly removing the phase slope is that the MIMO OFDM system is capable of operating at higher order QAM modulations (i.e., larger constellation of tones) at lower SNRs and therefore can achieve higher overall throughput.

Two exemplary methods for measurement of timing drift for an OFDM system include: (i) determining the phase slope observed on pilot subcarriers; or (ii) drift of the correlation peak derived from the product of the cyclic prefix with the conjugate of the corresponding samples at the end of the associated OFDM symbol.

In certain aspects, to correct for the phase slope a phase correction based on two phase slope estimates may be applied. The first estimate may be a combination of measured carrier frequency offset (CFO) and the carrier frequency to determine the clock offset. An estimated phase slope can then be computed for each OFDM symbol based on the elapsed time from the start of the packet. The measurement of the carrier frequency and CFO are susceptible to some error. However, any error in the carrier frequency measurement will result in an error in the estimated phase slope, which may then be corrected by measuring a residual phase slope from the tracking pilots on each OFDM symbol of the data portion of the packet. In further aspects, a moving average of the phase slope, to improve performance for long packets, may also be utilized. An advantage of using carrier measurements is that the estimate can be made before or during the data portion of transmission.

In some aspects, the carrier frequency offset measurement may be made during the preamble portion of the packet to formulate an estimate of the time drift and apply that estimate on each OFDM symbol during the data portion of the packet. Further, the CFO measurement provides greater accuracy in determining the time drift than a direct measurement since the carrier frequency is much higher than the system bandwidth (or equivalently the sample clock rate). For example, a simple frequency offset measurement can determine the frequency error to within +/−1 kHz. For a 2.4 GHz carrier frequency system this is equivalent to an error of 0.4 ppm. To achieve the same accuracy by a time-domain measurement would require measurement of 0.4 nsec of drift over a 1 msec packet, which is a much more difficult task.

By removing the estimated phase slope based on the CFO measured during the preamble and subsequently removing any residual phase slope based on a measurement of the phase slope between the two outer pilots (tones +/−21) an example MIMO OFDM system shows no performance degradation due to sampling frequency offset allowing the use of high order QAM modulations. Indeed, the phase slope is reduced to well below the 0.4 ppm that carrier frequency measurements alone would produce.

Further, in some aspects, the above approach may be implemented utilizing a minimum of hardware, including in particular a sine/cosine look up table, a cordic function and multiplier/adder blocks. Such a structure is now explained.

Figure 2:
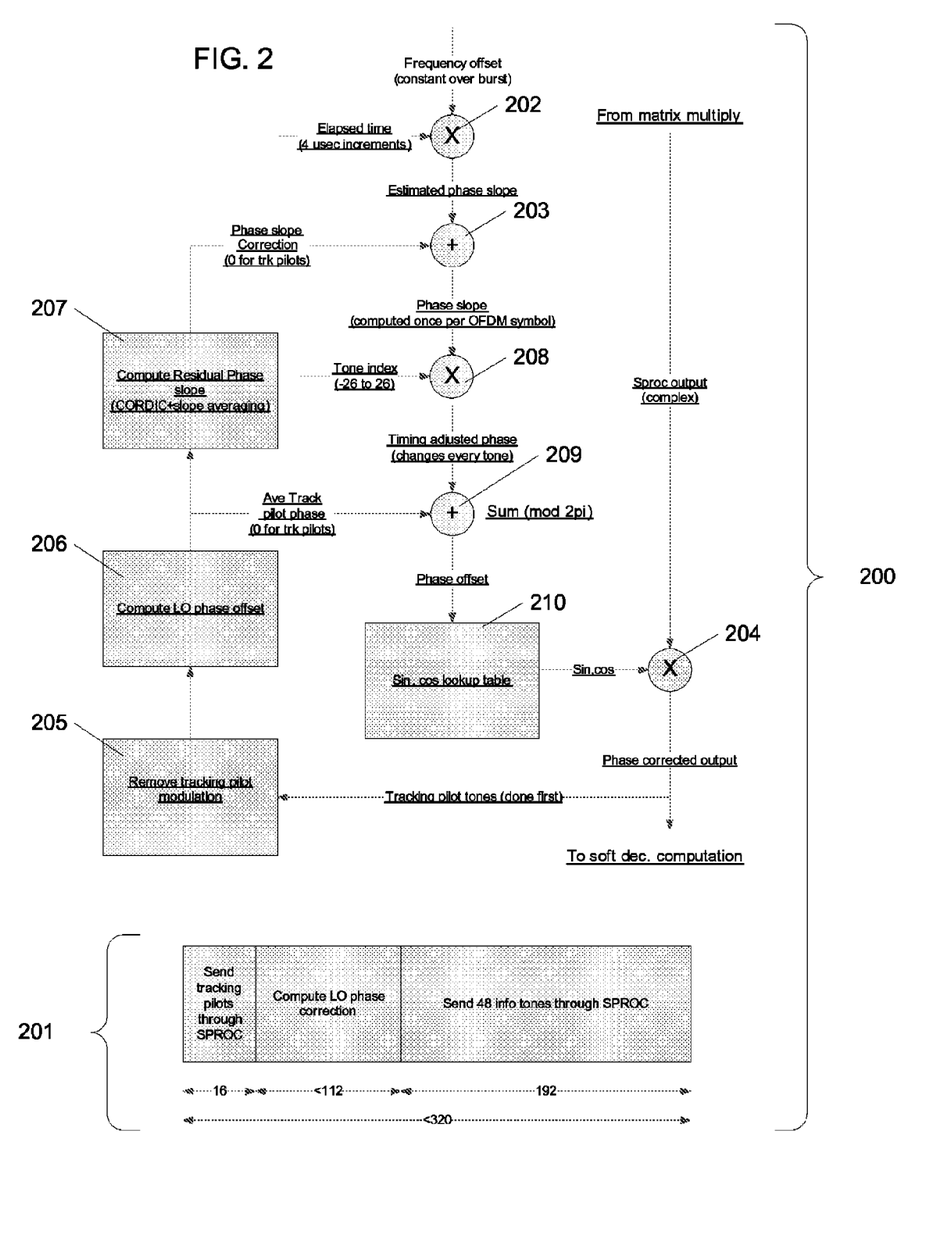
FIG. 2 is a structure for a phase correction process, in accordance with one or more aspects.

FIG. 2 illustrates a structure for a phase correction process, 200, having timing, 201, in accordance with one or more aspects.

In the structure of FIG. 2, a frequency offset taken to be roughly constant over a burst of data is first multiplied, 202, by an elapsed time since the beginning of a packet, for example in 4 μsec increments. The result is an estimated phase slope at the point in time. This estimated phase slope is then multiplied, 203, by a phase slope correction, referred to as a residual phase slope and derived as now described.

The output of a spatial multiply performed by a spatial processor (SPROC) is multiplied, 204, by a sin/cos value related to the total phase offset to be removed. The result is a phase corrected output that forms the output, and is also fed back to a module, 205, which removes the tracking pilot tone modulation. After removing the pilot tone modulation, the local oscillator (LO) phase offset is computed, 206. Next, the residual phase slope is computed from the LO phase offset, 207, for example using CORDIC plus slope averaging. As indicated above, the residual phase slope is multiplied, 203, by the estimated phase slope. The result is a total phase slope, which is then multiplied, 208, by a tone index, for example an integer between −26 and +26 in an exemplary embodiment, to produce a timing-adjusted phase value which changes from tone to tone.

Finally, the LO phase offset is summed with the timing-adjusted phase value, modulo 2π, 209, to produce a phase offset. The phase offset is applied to a sin/cos look-up table, to produce a sin/cos value applied to multiplier 204.

As mentioned above, the sample clock at the receiver is not locked to the transmitter clock, so timing drifts over the received packet. For example, if the packet is 2 milliseconds long and the clock error is 40 ppm (20 ppm at each end), then a drift of 80 nanoseconds or 1.6 samples occurs over a packet according to 802.11 framing. This is still small relative to the cyclic prefix, so adjustment of the FFT window is not necessary; however, with a shortened cyclic prefix, the FFT window should preferably be adjusted once slippage of 0.5 samples has occurred.

The described timing drift results in a phase slope across the OFDM tones. A one-sample timing slip results in almost 180 degree shifts for the tones at the edge of the band. To correct for this phase slope the measured frequency offset relative to the carrier frequency is used to determine the clock offset. Then an estimated slope can be computed for each OFDM symbol based on the elapsed time from the start of the packet.

The frequency measurement inevitably includes an error. The error in the frequency measurement results in an error in the phase slope correction. This error is not very great, and is significant only when a relatively large frequency error occurs on a long packet and in a system using a high order QAM constellation. According to one aspect, the residual phase slope is determined from the tracking pilots. Since the outer pilots (tones +/−21) have 3 times the error due to phase slope, only these are used in the phase slope computation.

Once the mean pilot phase, as determined by the frequency measurement, is removed from the outer pilots (and the pilot scramble sign and pilot 21 inversion is corrected), the outer pilots are roughly $ae^{jx}$ and $be^{-jx}$+noise. Therefore, equal gain combining, or other approaches, may be utilized to combine the conjugate of one pilot with the other pilot and obtain a complex value, p, $$p=p_{21}+p^*_{-21}=(a+b)e^{jx}+n,$$

where n is noise.

Since the phase, x, is quite small we average this complex value over a number of symbols. In simulation a simple one pole filter was used to generate an averaged, $p_{ave}$, $$p_{ave}=\alpha p+(1-\alpha)p_{ave},$$

where α is $2^{-4}$, $2^{-5}$, or $2^{-6}$.

In certain aspects, the averaging may be performed on the complex value, not the phase. In this way a large noise value which decreases the amplitude of p does not degrade the performance. Then the phase slope correction (per tone phase slope) is the angle of $p_{ave}$ divided by 21. The angle is determined by a CORDIC algorithm.

Figure 5:
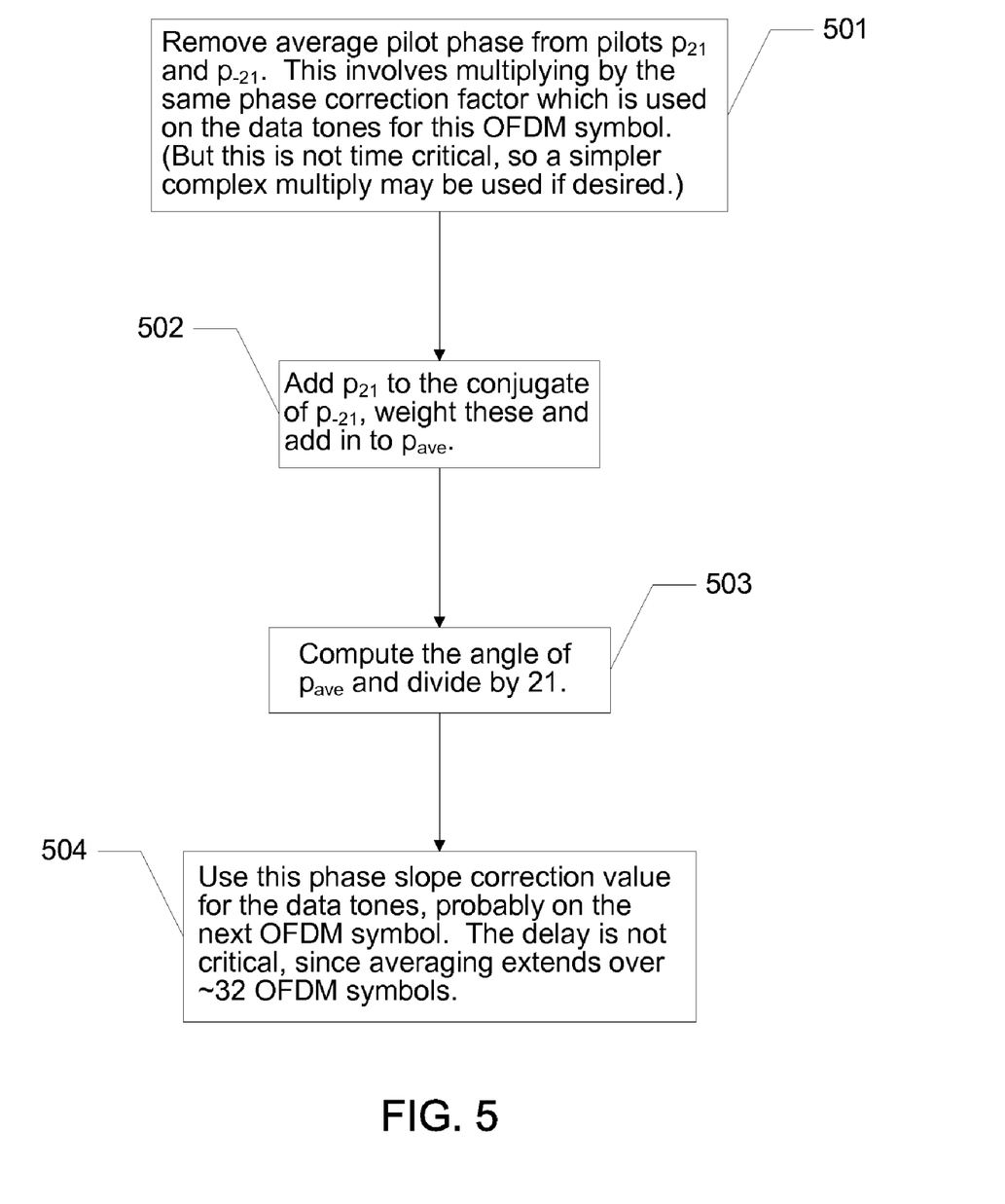
FIG. 5 is a process flow diagram of an aspect.

In certain aspects the above approach may be embodied as shown in FIG. 5 and described as follows:

501. Remove average pilot phase from pilots $p_{21}$ and $p_{-21}$. This involves multiplying by the same phase correction factor which is used on the data tones for this OFDM symbol. (But this is not time critical, so a simpler complex multiply may be used if desired.)

502. Add $p_{21}$ to the conjugate of $p_{-21}$, weight these and add in to $p_{ave}$.

503. Compute the angle of $p_{ave}$ and divide by 21.

504. Use this phase slope correction value for the data tones, probably on the next OFDM symbol. The delay is not critical, since averaging extends over ~32 OFDM symbols.

Figure 3:
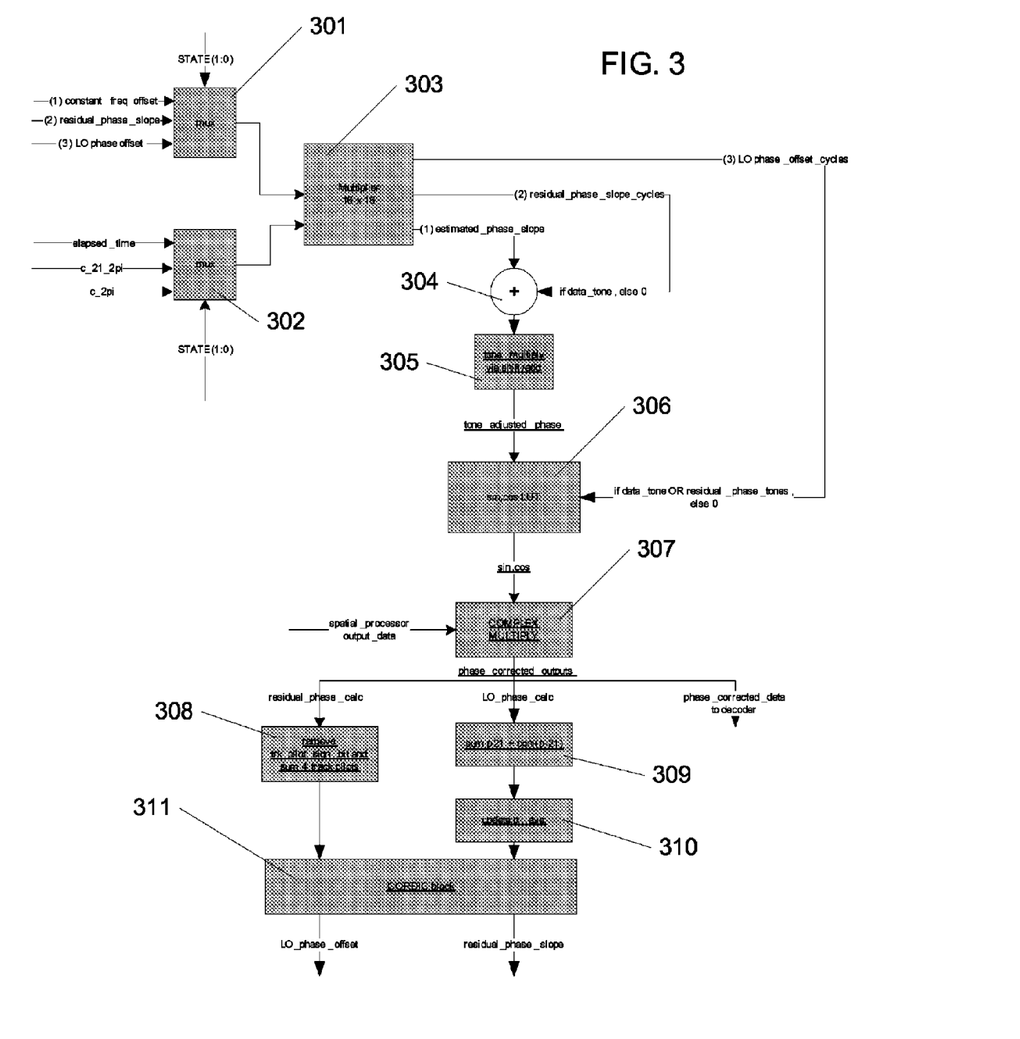
FIG. 3 is a block diagram of an implementation of the phase correction process, in accordance with one or more aspects.

The block diagram of FIG. 3 illustrates an implementation of a phase correction process in accordance with one or more aspects. Adaptive phase slope correction is a part of the overall exemplary time tracking processing. The end result of the process is the application of a phase correction applied at the output of a spatial processor (SPROC) on each OFDM sub-carrier of the data portion of the packet.

In accordance with the block diagram of FIG. 3, the structure of FIG. 2 is implemented using only two multiplexers, 301, 302, and one 16×16 multiplier, 303, along with several other components, all controlled by a simple state machine (not shown). This implementation is now described in greater detail.

The first multiplexer, 301, selects between inputs of the constant frequency offset, the residual phase slope and the LO phase offset, the selected one of which is one input to the multiplier, 303. The second multiplexer, 302, selects between inputs of the elapsed time, $c_{21}2\pi$ and $c2\pi$. Using suitable inputs, the multiplier, 303, produces the estimated phase slope and the residual phase slope values, which are fed to adder, 304. They are added to produce a total estimated phase slope, which is multiplied by the tone value using a shift and add, 305, to produce the tone adjusted phase (see also, FIG. 2, the signal between multiplier 208 and adder 209). The tone adjusted phase is fed to a sin/cos look-up table (LUT), 306, whose output is passed to a complex multiplier, 307, having a second input received from the SPROC.

The complex multiplier output, 307, may be used for the residual phase calculation, 308, 311, the LO phase calculation, 309, 310, or directly fed to the decoder as phase corrected data.

In the case of the residual phase calculation, first the tracking pilot sign bit is removed and the four tracking pilot values are summed, 308. The result is fed to the CORDIC block, 311, which computes the LO phase offset input to the first multiplexer, 301.

In the case of the LO phase calculation, the sum of the values of $p_{21}$ and the conjugate of $p_{-21}$ is computed, 309, the value of $p_{ave}$ is updated, 310, and the result is fed to the CORDIC block, 311. The CORDIC block, 311, then computes the residual phase slope input to the first multiplexer, 301.

In certain aspects, during the preamble portion of the packet the CFO is measured. This CFO is applied through a NCO working on the time domain signals in order to remove a single constant frequency offset between the transmitter and receiver clocks. In some aspects, time tracking, which may also be referred to as phase correction, processing involves the computation of a phase correction at each subcarrier during the data portion of the packet to compensate for the sampling frequency errors associated with 1) the local oscillator (LO) phase offset, e.g. the phase noise; and 2) the phase slope.

The (complex I/Q) QAM symbols coming for the SPROC block are multiplied (on a tone-by-tone basis) with the computed phase correction factor (complex I/Q) and then sent to our decoder block. The necessary phase correction factors are computed before the information tones are sent through the spatial processor allowing the phase correction to be applied without additional system delay.

Figure 6:
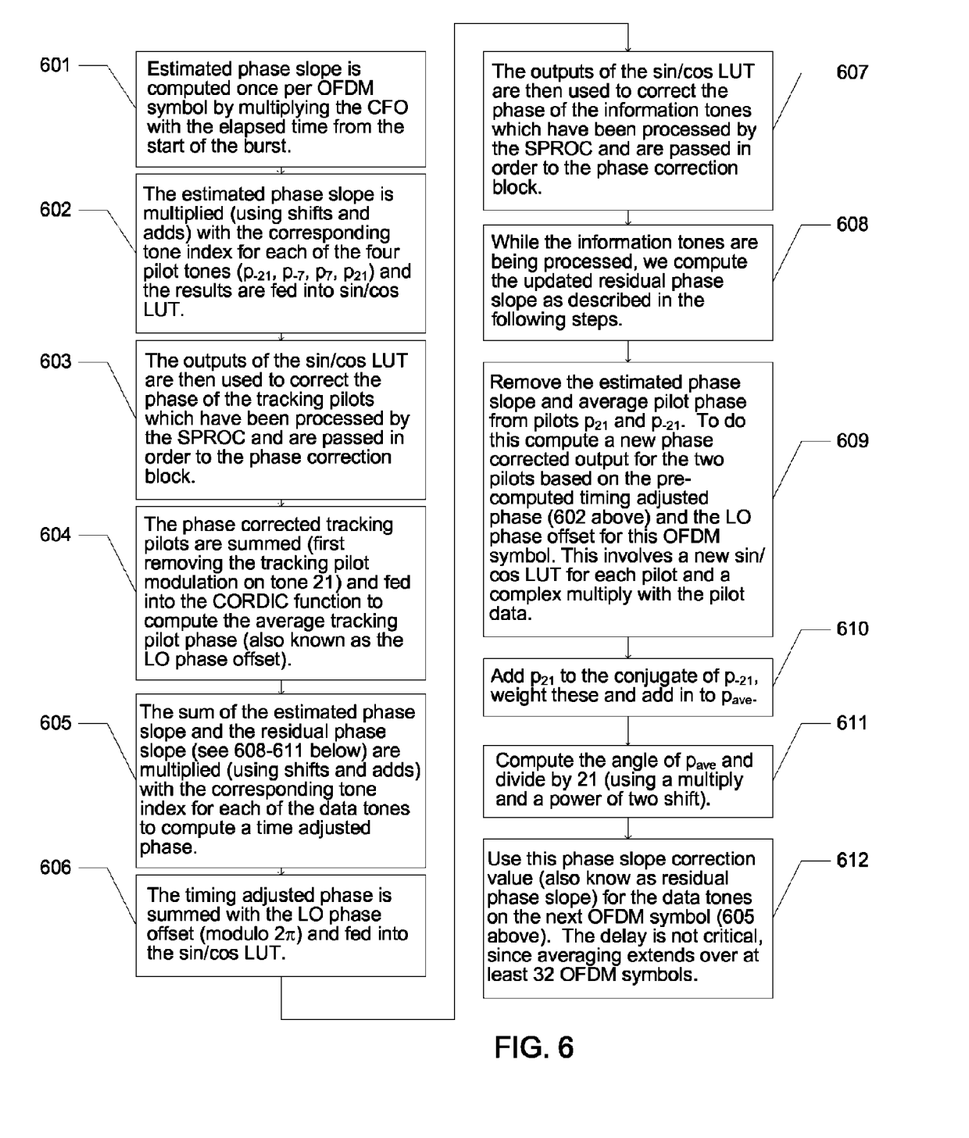
FIG. 6 is a process flow diagram of another aspect.

Processing steps for each OFDM symbol in the data portion of the packet, shown in FIG. 6, is discussed below, according to an aspect:

601. Estimated phase slope is computed once per OFDM symbol by multiplying the CFO with the elapsed time from the start of the burst.

602. The estimated phase slope is multiplied (using shifts and adds) with the corresponding tone index for each of the four pilot tones ($p_{-21}, p_{-7}, p_7, p_{21}$) and the results are fed into sin/cos LUT.

603. The outputs of the sin/cos LUT are then used to correct the phase of the tracking pilots which have been processed by the SPROC and are passed in order to the phase correction block.

604. The phase corrected tracking pilots are summed (first removing the tracking pilot modulation on tone $p_{21}$) and fed into the CORDIC function to compute the average tracking pilot phase (also known as the LO phase offset).

605. The sum of the estimated phase slope and the residual phase slope (see 608-611 below) are multiplied (using shifts and adds) with the corresponding tone index for each of the data tones to compute a time adjusted phase.

606. The timing adjusted phase is summed with the LO phase offset (modulo $2\pi$) and fed into the sin/cos LUT.

607. The outputs of the sin/cos LUT are then used to correct the phase of the information tones which have been processed by the SPROC and are passed in order to the phase correction block.

608. While the information tones are being processed, we compute the updated residual phase slope as described in the following steps.

609. Remove the estimated phase slope and average pilot phase from pilots $p_{21}$ and $p_{-21}$. To do this compute a new phase corrected output for the two pilots based on the pre-computed timing adjusted phase (602 above) and the LO phase offset for this OFDM symbol. This involves a new sin/cos LUT for each pilot and a complex multiply with the pilot data.

610. Add $p_{21}$ to the conjugate of $p_{-21}$, weight these and add in to $p_{ave}$.

611. Compute the angle of $p_{ave}$ and divide by 21 (using a multiply and a power of two shift).

612. Use this phase slope correction value (also know as residual phase slope) for the data tones on the next OFDM symbol (605 above). The delay is not critical, since averaging extends over at least 32 OFDM symbols.

The details of an exemplary hardware implementation are outlined in a block diagram in FIG. 3. The implementation consists of an eight-step state machine that allows the sharing of a 16×16 real multiplier, a CORDIC block, a sin/cos LUT and a 16×16 complex multiplier. The real multiplier is used for 3 operations; the computation of the estimated phase slope (CFO×elapsed time), the scaling of the LO phase offset into cycles, and the scaling of the residual phase offset into cycles, including the divide by 21.

Figure 4:
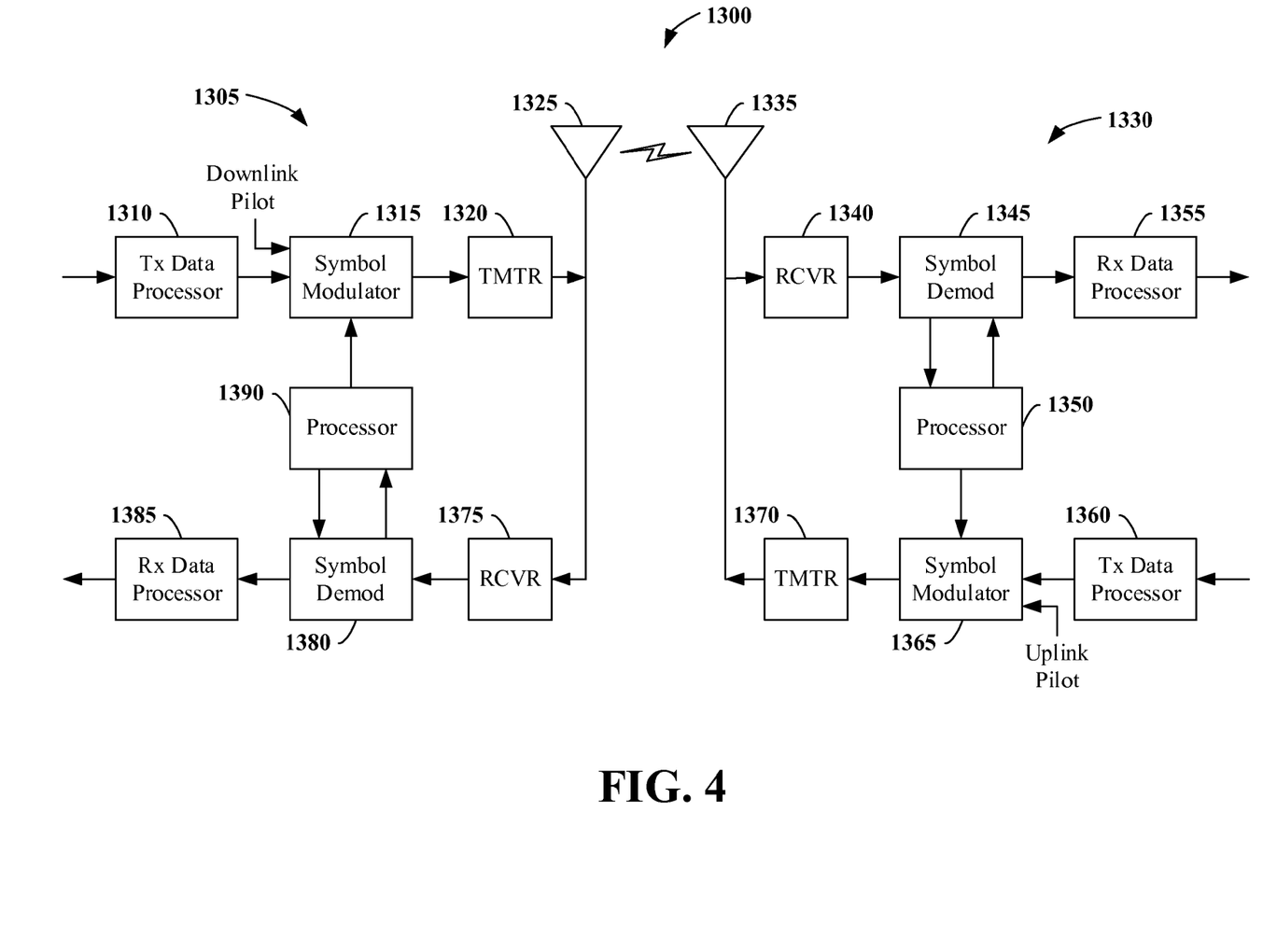
FIG. 4 is an illustration of a wireless network environment that can be employed in conjunction with the various systems and methods described herein.

FIG. 4 shows an exemplary wireless communication system 1300. The wireless communication system 1300 depicts one access point and one terminal for sake of brevity. However, it is to be appreciated that the system can include more than one access point and/or more than one terminal, wherein additional access points and/or terminals can be substantially similar or different for the exemplary access point and terminal described below.

Referring now to FIG. 4, on a downlink, at access point 1305, a transmit (TX) data processor 1310 receives, formats, codes, interleaves, and modulates (or symbol maps) traffic data and provides modulation symbols ("data symbols"). A symbol modulator 1315 receives and processes the data symbols and pilot symbols and provides a stream of symbols. A symbol modulator 1315 multiplexes data and pilot symbols and provides them to a transmitter unit (TMTR) 1320. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1320 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1325 to the terminals. At terminal 1330, an antenna 1335 receives the downlink signal and provides a received signal to a receiver unit (RCVR) 1340. Receiver unit 1340 conditions (e.g., filters, amplifies, and frequency downconverts) the received signal and digitizes the conditioned signal to obtain samples. A symbol demodulator 1345 demodulates and provides received pilot symbols to a processor 1350 for channel estimation. Symbol demodulator 1345 further receives a frequency response estimate for the downlink from processor 1350, performs data demodulation on the received data symbols to obtain data symbol estimates (which are estimates of the transmitted data symbols), and provides the data symbol estimates to an RX data processor 1355, which demodulates (i.e., symbol demaps), deinterleaves, and decodes the data symbol estimates to recover the transmitted traffic data. The processing by symbol demodulator 1345 and RX data processor 1355 is complementary to the processing by symbol modulator 1315 and TX data processor 1310, respectively, at access point 1305.

On the uplink, a TX data processor 1360 processes traffic data and provides data symbols. A symbol modulator 1365 receives and multiplexes the data symbols with pilot symbols, performs modulation, and provides a stream of symbols. A transmitter unit 1370 then receives and processes the stream of symbols to generate an uplink signal, which is transmitted by the antenna 1335 to the access point 1305.

At access point 1305, the uplink signal from terminal 1330 is received by the antenna 1325 and processed by a receiver unit 1375 to obtain samples. A symbol demodulator 1380 then processes the samples and provides received pilot symbols and data symbol estimates for the uplink. An RX data processor 1385 processes the data symbol estimates to recover the traffic data transmitted by terminal 1330. A processor 1390 performs channel estimation for each active terminal transmitting on the uplink. Multiple terminals may transmit pilot concurrently on the uplink on their respective assigned sets of pilot subbands, where the pilot subband sets may be interlaced.

Processors 1390 and 1350 direct (e.g., control, coordinate, manage, etc.) operation at access point 1305 and terminal 1330, respectively. Respective processors 1390 and 1350 can be associated with memory units (not shown) that store program codes and data. Processors 1390 and 1350 can also perform computations to derive frequency and impulse response estimates for the uplink and downlink, respectively. Further, processors 1390 and 1350 may perform the phase corrections as described herein, e.g. with respect to FIGS. 1-3, based upon instructions contained in memory.

Another technique, referred to as decision-directed phase estimation can be used, with or without separate frequency correction as described above. Decision-directed phase estimation also doe a coarse correction followed by a fine correction. Decision-directed phase estimation is now described.

In a MIMO OFDM system, each data OFDM symbol contains data subcarriers and pilot subcarriers. The pilot subcarriers carry symbols that are known to both the transmitter and the receiver. The phase estimate may be obtained from the pilot symbol by demodulating the received signal and comparing the received symbol estimate to the known transmitted symbol, as follows:

$$\hat{\theta} = \tan^{-1}(p^* \hat{p})$$

where
p is the known transmitted pilot symbol,
$\hat{p}$ is the estimate of the pilot symbol at the receiver, and
$\hat{\theta}$ is the estimate of the phase.
When more than one pilot symbol is available, the dot products of the known and received symbols are summed over all dimensions, where a dimension may be a subcarrier, a spatial stream, etc. For example, if an OFDM symbol contains $N_P$ pilot symbols, the phase estimate would be obtained as follows:

$$\hat{\theta} = \tan^{-1}\left(\sum_{i=0}^{N_P-1}(p_i^* \hat{p}_i)\right).$$

In a MIMO OFDM system, the number pilot symbols is the sum of all pilot streams over all pilot subcarriers ($N_{PilotSubcarriers}$):

$$N_P = \sum_{k=0}^{N_{PilotSubcarriers}} N_{PilotStreams}(k),$$

where $N_{PilotStreams}$ (k) is the number of pilot streams on subcarrier index k. The number of pilot streams may be one, equal to the number of data streams, max(number of transmit antennas, number of receive antennas), or independent of all these parameters. The number of pilot streams may vary from subcarrier to subcarrier or from OFDM symbol to OFDM symbol. In a SISO system, the number of pilot streams is one.

The number of pilot symbols is typically much smaller than the number of data symbols. Thus, it is possible to improve the estimate of the phase by using the data symbols. The data symbols are not known at the receiver; however, the receiver can obtain an estimate of the transmitted symbols by demodulating the received data and making hard decisions on the demodulated symbols. That is, the receiver makes a decision based on the best estimate it can made as to which symbol is has received. The hard decisions are then compared to the demodulated symbols, and the phase estimate is determined in the same manner as for the pilot symbols. For example, if an OFDM symbol contains $N_S$ data symbols, the phase estimate would be obtained as follows:

$$\hat{\theta} = \tan^{-1}\left(\sum_{i=0}^{N_S-1}(\tilde{s}_i^* \hat{s}_i)\right)$$

where
$\hat{s}_i$ is the estimate of the received symbol (obtained by MMSE receiver, for example) and
$\tilde{s}_i$ is the hard decision made on $\hat{s}_i$.
Hard decisions may be made because the data rate (and thus, the constellation used) is known.

In a MIMO OFDM system, the number of data symbols is the sum of all data streams over all data subcarriers ($N_{DataSubcarriers}$):

$$N_S = \sum_{k=0}^{N_{DataSubcarriers}} N_{DataStreams}(k)$$

where $N_{DataStreams}$ (k) the number of data streams on subcarrier index k. The number of data streams, $N_{DataStreams}$ (k), is bounded above by the maximum of the number of transmit antennas and the number of receive antennas. In a SISO system, the number of data streams is one.

For an OFDM symbol that contains both data and pilot symbols, the phase estimate is obtained by using information from both sources, as follows:

$$\hat{\theta} = \tan^{-1}\left(\sum_{i=0}^{N_S-1}(\mu_i \tilde{s}_i^* \hat{s}_i) + \sum_{i=0}^{N_P-1}(\alpha_i p_i^* \hat{p}_i)\right),$$

where the summations are made over all dimensions, that is, summations are made over all subcarriers and spatial streams. Scaling factors $\mu_i$ and $\alpha_i$ are applied to the $\tilde{s}_i^* \hat{s}_i$ and $p_i^* \hat{p}_i$ terms, respectively, to account for differences in signal to noise ratio (SNR) and errors in making the hard decisions that may vary from symbol to symbol. These factors depend generally on the SNR and QAM constellation in use, but may also vary with such other parameters as the skilled artisan may find useful. Incorrect decisions regarding the determination of $\hat{s}_i$ can still bias the result. Better scaling may be achieved by separating the terms $\tilde{s}_i^* \hat{s}_i$ and $p_i^* \hat{p}_i$ into their Real and Imaginary parts and applying complex scale factors having both Real and Imaginary parts, $Re(\mu_i)$, $Im(\mu_i)$, $Re(\alpha_i)$ and $Im(\alpha_i)$, allowing errors in the determination of $\hat{s}_i$ to be removed by adjusting the relative scaling of Real and Imaginary components of the term.

On each OFDM symbol, the phase estimate is obtained as described above, and the received signal is corrected by $e^{-j\hat{\theta}}$ on all subcarriers and streams. Following the phase correction, the data subcarriers are demodulated (using MMSE receiver, as an example) and decoded to obtain bit decisions.

The phase offset caused by an error in the frequency offset estimate causes a phase slope over time. Thus, at each OFDM symbol, a running total of all previous phase corrections is kept:

$$\hat{\theta}_{total} = \hat{\theta}_{total} + \hat{\theta},$$

where $\hat{\theta}_{total}$ is initialized to zero at the first OFDM symbol. On each OFDM symbol, prior to MMSE demodulation and making hard decisions, the received signal is corrected by $e^{-j\hat{\theta}_{total}}$.

Figure 7:
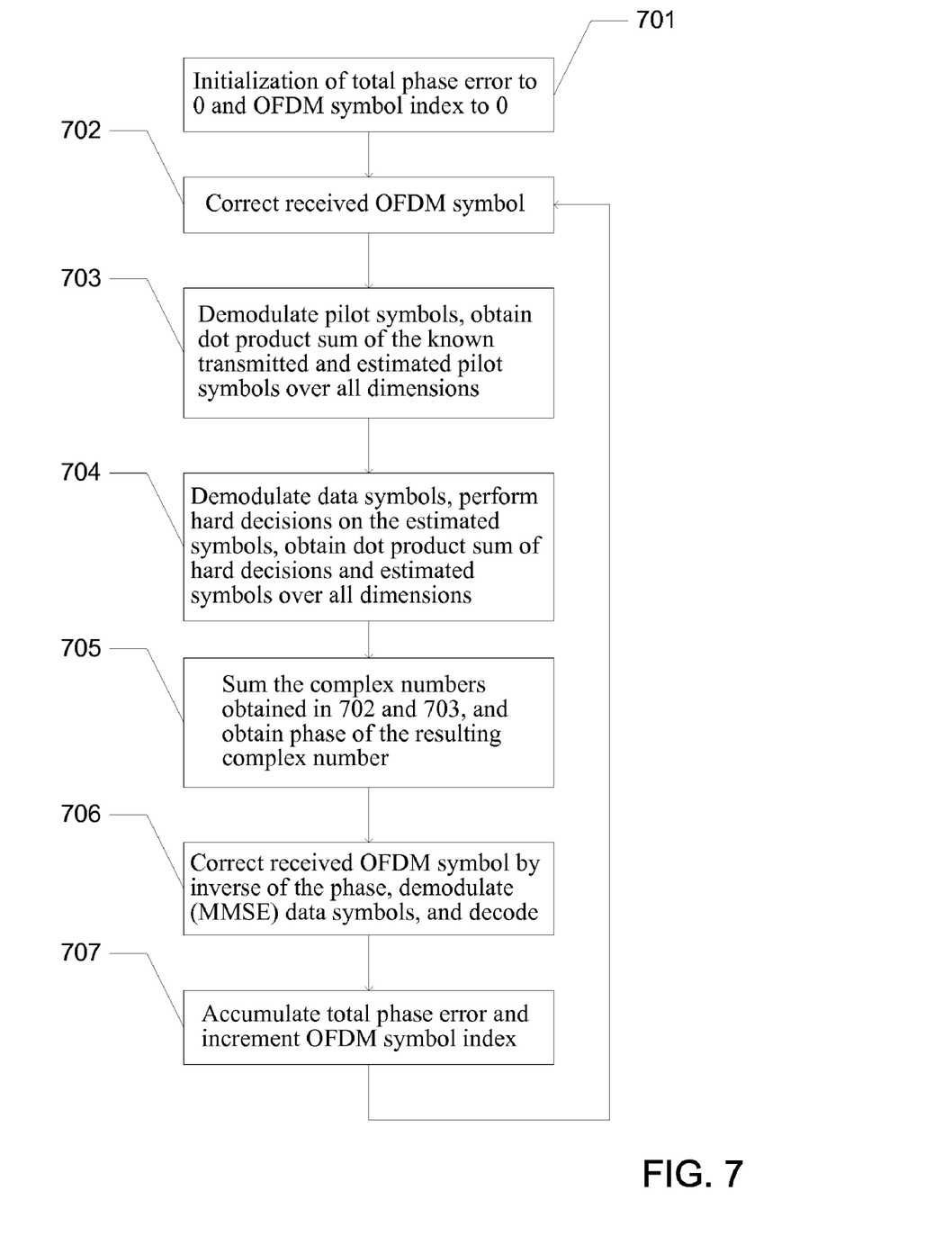
FIG. 7 is a process flow diagram of yet another aspect.

A flowchart of the phase estimation and correction process, shown in FIG. 7, may be summarized in the following procedure:

701. Initialization: $\hat{\theta}_{total}=0$, OFDM symbol index n=0.
702. Correct received OFDM symbol by $e^{-j\hat{\theta}_{total}}$.
703. Demodulate pilot symbols, obtain dot product sum of the known transmitted and estimated pilot symbols over all dimensions.
704. Demodulate data symbols, perform hard decisions on the estimated symbols, obtain dot product sum of hard decisions and estimated symbols over all dimensions.
705. Sum the complex numbers obtained in 703 and 704, and obtain phase of the resulting complex number, $\hat{\theta}$.

706. Correct received OFDM symbol by inverse of the phase, demodulate (MMSE) data symbols, and decode.

707. $\hat{\theta}_{total} = \hat{\theta}_{total} + \hat{\theta}$; n=n+1; and, go to 702.

Note that each symbol is phase-corrected and decoded twice, 702-704 and 705-706.

The above phase estimation technique was described for the case when a residual frequency offset error causes a phase slope over time. However, this method may also be used for phase error that does not grow in time, but is a random walk from one OFDM symbol to the next, such as phase noise. Furthermore, the technique may be used with multiple streams and varying rates on the streams.

The above method requires the data symbols to be demodulated twice. Assuming a small residual frequency error, the phase obtained on OFDM symbol n may be applied to OFDM symbol n+1. Thus, the current OFDM symbol would only be corrected by $\hat{\theta}_{total}$ and not corrected by $\hat{\theta}$. To obtain a correction on the initial OFDM symbol, a phase estimate would be obtained from the OFDM symbol immediately preceding the data portion of the packet, such as the MIMO training.

Figure 8:
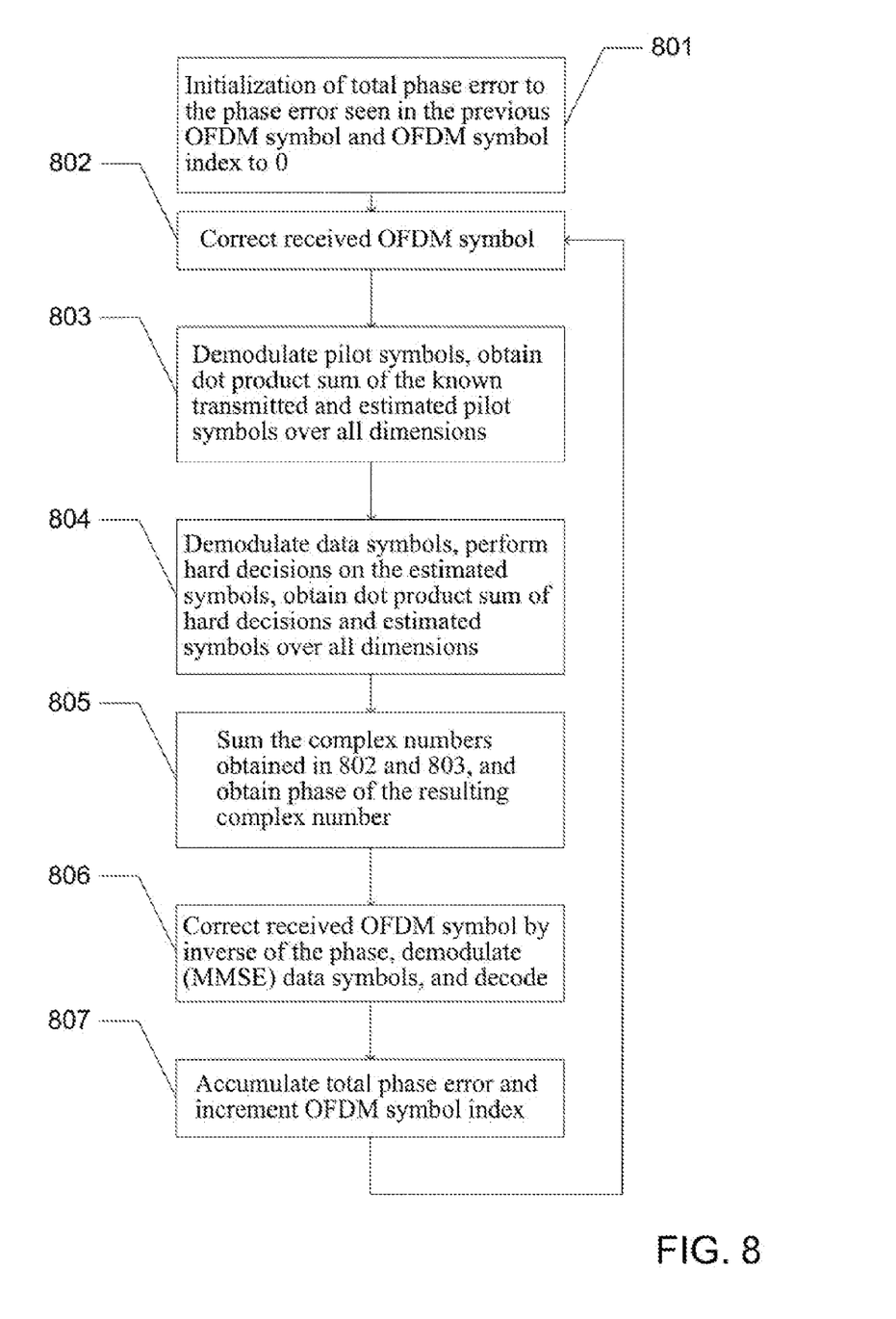
FIG. 8 is a process flow diagram of a further aspect.

The reduced-complexity phase estimation and correction procedure, shown in FIG. 8, would thus be:

801. Initialization:
$\hat{\theta}_{total} = \hat{\theta}_{pre}$, where $\hat{\theta}_{pre}$ is the phase estimate obtained from the OFDM symbol immediately preceding the data,
OFDM symbol index n=0.

802. Correct received OFDM symbol by $e^{-j\hat{\theta}_{total}}$.

803. Demodulate pilot symbols, obtain dot product sum of the known transmitted and estimated pilot symbols over all dimensions.

804. Demodulate data symbols, perform hard decisions on the estimated symbols, obtain dot product sum of hard decisions and estimated symbols over all dimensions.

805. Sum the complex numbers obtained in 803 and 804, and obtain phase of the resulting complex number, $\hat{\theta}$.

806. Decode demodulated data symbols from 804.

807. $\hat{\theta}_{total} = \hat{\theta}_{total} + \hat{\theta}$; n=n+1; and go to 802.

Again, each symbol is phase-corrected and decoded twice, 802-804 and 805-806.

When eigensteering is used at the transmitter, the multiple spatial channels created have varying SNRs. As a result, the best way to obtain a phase estimate is by doing maximal ratio combining (MRC) based on the SNRs on the different streams. This technique is general and works with any transmission scheme; when the SNRs on all streams are equal, this technique reduces to that described immediately above.

One way to do MRC is to combine over spatial streams on a per-subcarrier basis. As a result, all subcarriers are treated equally. For an OFDM symbol that contains both data and pilot symbols, the phase estimate is obtained by using information from both sources, as follows:

$$\hat{\theta} = \tan^{-1}\left(\sum_{k=0}^{K_S-1}\sum_{i=0}^{N_{SS}-1} \frac{\sqrt{\gamma_S(k,i)}}{\sqrt{\gamma_{S,TOT}(k)}}(\tilde{s}_i^*\hat{s}_i) + \sum_{k=0}^{K_P-1}\sum_{i=0}^{N_{PS}-1} \frac{\sqrt{\gamma_P(k,i)}}{\sqrt{\gamma_{P,TOT}(k)}}(p_i^*\hat{p}_i)\right),$$

where
$K_S$ is the number of data symbol subcarriers,
$N_{SS}$ is the number of data spatial streams,
$\gamma_S(k,i)$ is the SNR on the data symbol on data spatial stream i of subcarrier k, $$\gamma_{S,TOT}(k) = \sum_{i=0}^{N_{SS}-1} \gamma_S(k,i)$$

is the total SNR, summed over all data spatial streams, on subcarrier k,
$K_P$ is the number of pilot symbol subcarriers,
$N_{PS}$ is the number of pilot spatial streams,
$\gamma_P(k,i)$ is the SNR on the pilot symbol on pilot spatial stream i of subcarrier k, $$\gamma_{P,TOT}(k) = \sum_{i=0}^{N_{PS}-1} \gamma_P(k,i)$$

is the total SNR, summed over all pilot spatial streams, on subcarrier k.

Another way to MRC is to combine over all dimensions, such as spatial streams and subcarriers. For an OFDM symbol that contains both data and pilot symbols, the phase estimate is obtained by using information from both sources, as follows:

$$\hat{\theta} = \tan^{-1}\left(\sum_{i=0}^{N_S-1} \sqrt{\gamma_S(i)}(\tilde{s}_i^*\hat{s}_i) + \sum_{i=0}^{N_P-1} \sqrt{\gamma_P(i)}(p_i^*\hat{p}_i)\right),$$

where $\gamma_S(i)$ is the is the SNR on the data symbol on dimension i and $\gamma_P(i)$ is the SNR on the pilot symbol on dimension i. This phase estimate also includes scale factors applied to the $\tilde{s}_i^*\hat{s}_i$ and $p_i^*\hat{p}_i$ terms, which may be similarly understood and varied as described above.

For an OFDM symbol that contains both data and pilot symbols, the phase estimate is obtained by using information from both sources, as follows:

$$\hat{\theta} = \tan^{-1}\left(\sum_{k=0}^{K_S-1}(\tilde{s}_0^*\hat{s}_0) + \sum_{k=0}^{K_P-1}(p_0^*\hat{p}_0)\right),$$

where the summation is performed over all data symbol subcarriers and pilot symbol subcarriers, and only the highest-mode symbols (denoted by the subscript 0) are used.

Since the SNRs on the different streams are different, another way to obtain a phase estimate is to use the highest-SNR symbols, which, in the case of eigensteering, corresponds to using the symbols transmitted on the principal eigenmode.

The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units and executed by processors. The software codes may be stored in memory unit and executed, for example, by the processors 1390 and 1350 of the hardware. The memory unit may be implemented within the processor or external to the processor, in which case it can be communicatively coupled to the processor via various means as is known in the art.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

What has been described above includes examples of one or more embodiments. It is, of course, not possible to describe every conceivable combination of components or methodologies for purposes of describing the aforementioned embodiments, and many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method of phase correction at a wireless device comprising:
   estimating a phase slope for an OFDM symbol in a data portion of a packet;
   measuring a residual phase slope for the OFDM symbol in the data portion of the packet, the residual phase slope being based on a measurement of a phase slope between tracking pilots contained in the packet; and
   adjusting a phase correction based upon the phase slope and the residual phase slope.

2. The method of claim 1, adjusting further comprising: adjusting based upon a moving average of the phase slope.

3. The method of claim 1, estimating further comprising: measuring an elapsed time from a start time for the packet.

4. The method of claim 1, estimating further comprising: comparing an estimate of a received pilot symbol with a known transmitted pilot symbol.

5. The method of claim 4, further comprising:
   estimating unknown data symbols;
   obtaining an estimated phase adjustment from the estimated data symbols; and
   applying the estimated phase adjustment before adjusting the phase correction.

6. The method of claim 1, measuring further comprising:
   removing an average pilot phase from received pilot symbols;
   forming conjugates of received pilot symbols;
   combining the conjugates with the received pilot symbols;
   weighting the combined conjugates and received pilot symbols;
   computing angle information; and wherein adjusting further comprises:
   correcting packets received during a burst including the received pilot symbols using the angle information.

7. The method of claim 1, measuring further comprising:
   removing an average phase from received data symbols;
   forming conjugates of received data symbols;
   combining the conjugates with the received data symbols;
   weighting the combined conjugates and received data symbols;
   computing angle information; and wherein adjusting further comprises:
   correcting packets received during a burst including the received data symbols using the angle information.

8. An electronic device configured to perform the method of claim 1.

9. A non-transitory computer-readable medium comprising instructions which, when executed by a computer cause the computer to perform operations, the instructions including:
   instructions for estimating a phase slope for an OFDM symbol in a data portion of a packet based on an elapsed time from the start of the packet;
   instructions for measuring a residual phase slope from tracking pilots for the OFDM symbol in the data portion of the packet, the residual phase slope being based on a measurement of a phase slope between tracking pilots contained in the packet; and
   instructions for adjusting a phase correction based upon the phase slope and the residual phase slope.

10. Apparatus for performing phase correction at a wireless device comprising:
    means for receiving tracking pilots for an OFDM symbol;
    means for estimating a phase slope for the OFDM symbol in a data portion of a packet based on an elapsed time from the start of the packet;
    means for measuring a residual phase slope from tracking pilots for the OFDM symbol in the data portion of the packet, the residual phase slope being based on a measurement of a phase slope between tracking pilots contained in the packet; and
    means for adjusting a phase correction based upon the phase slope and the residual phase slope.

11. The apparatus of claim 10, the means for adjusting further comprising:
    means for adjusting based upon a moving average of the phase slope.

12. The apparatus of claim 10, the means for estimating further comprising:
    means for measuring an elapsed time from a start time for the packet.

13. The apparatus of claim 10, the means for estimating further comprising:
    means for comparing an estimate of a received pilot symbol with a known transmitted pilot symbol.

14. The apparatus of claim 13, the means for measuring a residual phase slope further comprising:
    means for estimating unknown data symbols;
    means for obtaining an estimated phase adjustment from the estimated data symbols; and
    means for applying the estimated phase adjustment before adjusting the phase correction.

15. The apparatus of claim 10, the means for measuring further comprising:
    means for removing an average pilot phase from received pilot symbols;
    means for forming conjugates of received pilot symbols;
    means for combining the conjugates with the received pilot symbols;
    means for weighting the combined conjugates and received pilot symbols;
    means for computing angle information; and wherein adjusting further comprises:
    means for correcting packets received during a burst including the received pilot symbols using the angle information.

16. The apparatus of claim 10, the means for measuring further comprising:
    means for removing an average phase from received data symbols;
    means for forming conjugates of received data symbols;
    means for combining the conjugates with the received data symbols;
    means for weighting the combined conjugates and received data symbols;
    means for computing angle information; and wherein adjusting further comprises:
    means for correcting packets received during a burst including the received data symbols using the angle information.

17. Apparatus for performing phase correction at a wireless device comprising:
    at least one processor configured to adjust a phase correction for received signals, the at least one processor configured to adjust the phase correction based upon a phase slope and a residual phase slope by, wherein the at least one processor is configured to estimate the phase slope for an OFDM symbol in a data portion of a packet based on an elapsed time from the start of the packet and measure a residual phase slope from tracking pilots for the OFDM symbol in the data portion of the packet, the residual phase slope being based on a measurement of a phase slope between tracking pilots contained in the packet; and
    a memory coupled to the at least one processor.

18. The apparatus of claim 17, wherein the at least one processor is configured to adjust based upon a moving average of the phase slope.

19. The apparatus of claim 17, wherein the at least one processor is configured to comparing an estimate of a received pilot symbol with a known transmitted pilot symbol.

* * * * *

UNITED STATES PATENT AND TRADEMARK OFFICE
CERTIFICATE OF CORRECTION

| | | |
|---|---|---|
| PATENT NO. | : 8,081,728 B2 | Page 1 of 1 |
| APPLICATION NO. | : 11/734961 | |
| DATED | : December 20, 2011 | |
| INVENTOR(S) | : Mark S. Wallace et al. | |

It is certified that error appears in the above-identified patent and that said Letters Patent is hereby corrected as shown below:

ON THE TITLE PAGE:

Item (75) Inventors:

Irena Medvedev should be listed as Irina Medvedev

Signed and Sealed this
Fourteenth Day of February, 2012

David J. Kappos
*Director of the United States Patent and Trademark Office*